(12) United States Patent
Das et al.

(10) Patent No.: US 10,348,806 B2
(45) Date of Patent: Jul. 9, 2019

(54) TRANSFERRING DATA USING MOBILE DEVICES

(71) Applicant: PAYPAL, INC., San Jose, CA (US)

(72) Inventors: Ananya Das, Austin, TX (US); Bryant Genepang Luk, Round Rock, TX (US); Christopher Diebold O'Toole, Cedar Park, TX (US); Shaun Warman, Austin, TX (US); Jason Ziaja, Cedar Park, TX (US)

(73) Assignee: PAYPAL, INC., San Jose, CA (US)

( * ) Notice: Subject to any disclaimer, the term of this patent is extended or adjusted under 35 U.S.C. 154(b) by 344 days.

(21) Appl. No.: 15/199,374

(22) Filed: Jun. 30, 2016

(65) Prior Publication Data

US 2018/0007119 A1 Jan. 4, 2018

(51) Int. Cl.
| | |
|---|---|
| H04L 29/08 | (2006.01) |
| G06Q 30/02 | (2012.01) |
| H04L 29/06 | (2006.01) |
| H04W 4/02 | (2018.01) |
| H04W 4/021 | (2018.01) |
| H04W 4/029 | (2018.01) |
| H04W 12/02 | (2009.01) |

(52) U.S. Cl.
CPC ......... *H04L 67/06* (2013.01); *G06Q 30/0239* (2013.01); *H04L 63/0428* (2013.01); *H04L 67/18* (2013.01); *H04L 67/2842* (2013.01); *H04L 67/2847* (2013.01); *H04W 4/021* (2013.01); *H04W 4/029* (2018.02); *H04W 12/02* (2013.01)

(58) Field of Classification Search
CPC ..... H04L 67/06; H04L 67/18; H04L 67/2842; H04L 67/2847; H04L 63/0428; H04W 12/02; H04W 4/029; H04W 4/021; H04W 36/32; H04W 84/18; G06Q 30/0239; G06Q 30/0261
See application file for complete search history.

(56) References Cited

U.S. PATENT DOCUMENTS

| | | |
|---|---|---|
| 6,816,730 B2 | 11/2004 | Davies et al. |
| 6,831,896 B1 | 12/2004 | Lempio et al. |

(Continued)

OTHER PUBLICATIONS

U.S. Appl. No. 62/317,158, Apr. 2016, Desai; Vipul.*

*Primary Examiner* — Chris Parry
*Assistant Examiner* — Soe M Hlaing
(74) *Attorney, Agent, or Firm* — Haynes and Boone, LLP

(57) ABSTRACT

An example method for transferring a data set includes: detecting that a user device is within a first predefined proximity to a first data storage device; determining a next destination of the user device based on user travel information; selecting a data set stored on the data storage device in accordance with the next destination of the user device, wherein the data set is associated with a destination location; transferring the data set from the data storage device to the user device; detecting that the user device is within a second predefined proximity to a second data storage device; determining a location of the second data storage device; determining that a predefined relationship exists between destination location of the data set and the location of the second data storage device; and responsive to the determining, transferring the data set from the user device to the second data storage device.

20 Claims, 5 Drawing Sheets

(56) References Cited

U.S. PATENT DOCUMENTS

| | | | |
|---|---|---|---|
| 8,243,661 B2 | 8/2012 | Agrawal et al. | |
| 8,548,503 B2 | 10/2013 | Oh | |
| 9,444,897 B1 * | 9/2016 | Bostick | H04L 67/18 |
| 2002/0156861 A1 | 10/2002 | Pierce | |
| 2003/0220114 A1 | 11/2003 | Langensteiner et al. | |
| 2004/0162059 A1 | 8/2004 | Hiltunen et al. | |
| 2007/0274241 A1 * | 11/2007 | Brothers | H04L 67/06 |
| | | | 370/310 |
| 2007/0299681 A1 * | 12/2007 | Plastina | G06Q 30/02 |
| | | | 705/51 |
| 2009/0131079 A1 | 5/2009 | Sekhar | |
| 2010/0195569 A1 | 8/2010 | Matsushita et al. | |
| 2010/0202339 A1 | 8/2010 | Chieng et al. | |
| 2010/0287052 A1 | 11/2010 | Minter et al. | |
| 2011/0201275 A1 | 8/2011 | Jabara et al. | |
| 2013/0065584 A1 | 3/2013 | Lyon et al. | |
| 2013/0099920 A1 | 4/2013 | Song et al. | |
| 2013/0133087 A1 | 5/2013 | Proctor et al. | |
| 2013/0204937 A1 | 8/2013 | Fernando et al. | |
| 2014/0019496 A1 * | 1/2014 | Chiu | H04L 67/06 |
| | | | 707/827 |
| 2014/0036683 A1 | 2/2014 | Krishnamurthy et al. | |
| 2014/0040374 A1 | 2/2014 | Olsen et al. | |
| 2014/0188992 A1 | 7/2014 | Jayawardane | |
| 2014/0229618 A1 | 8/2014 | Kumar et al. | |
| 2014/0321317 A1 | 10/2014 | Kasslin et al. | |
| 2015/0189465 A1 * | 7/2015 | Siliski | H04W 4/02 |
| | | | 455/456.3 |
| 2016/0080235 A1 * | 3/2016 | Tan | H04L 43/0888 |
| | | | 370/235 |

* cited by examiner

300

```
Detect that a user device is within a first predefined proximity to a first
data storage device.
                                                                          302
```

```
Determine a next destination of the user device based on user travel
information.
                                                                          304
```

```
Select a data set stored on the data storage device in accordance with
the next destination of the user device. The data set is associated with a
destination location.                                                     306
```

```
Transfer the data set from the data storage device to the user device.
                                                                          308
```

```
Detect that the user device is within a second predefined proximity to a
second data storage device.
                                                                          310
```

```
Determine a location of the second data storage device.
                                                                          312
```

```
Determine that a predefined relationship exists between destination
location of the data set and the location of the second data storage device.
                                                                          314
```

```
In response to determining the predefined relationship, transfer the
data set from the user device to the second data storage device.
                                                                          316
```

Figure 3

TRANSFERRING DATA USING MOBILE DEVICES

TECHNICAL FIELD

The present disclosure relates generally to data transfers, and in particular, to data transfers using mobile user devices.

BACKGROUND

Transferring data from one location to another without aid of the Internet may be technically challenging. The user sending the data may have to mail a data storage device storing the data to the destination location where the data recipient can receive the data storage device and then access the data stored thereon, such as by plugging it into a computing device. This "sending the data by mail" approach is burdensome and may not be reliable, such as if the storage device is lost or damaged during the mail delivery.

Moreover, this "sending the data by mail" approach may not work, if the destination location is an off-the-grid location that is not well supported by a parcel delivery network.

There is therefore a need for a device, system, and method, which improvise data transfer, e.g., to an off-the-grid location, where Internet availability is low or non-existent.

BRIEF DESCRIPTION OF THE FIGURES

FIG. 3 is a flow chart illustrating an embodiment of a method for transferring data using mobile user devices.

Figure 1:
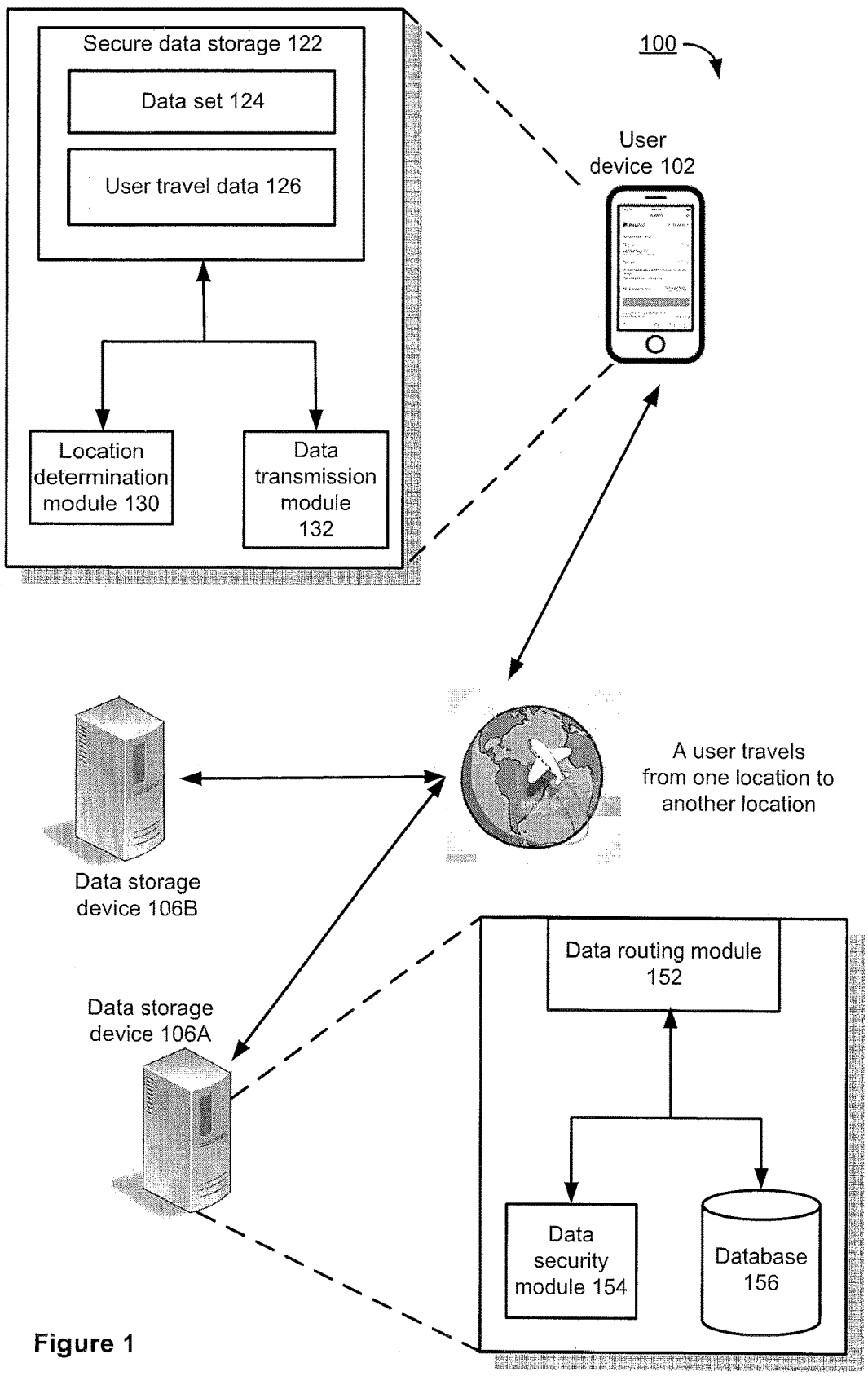
FIG. 1 is a schematic view illustrating an embodiment of a system for transferring data using mobile user devices.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The systems and methods described in the present disclosure may break a larger digital or electronic data set into a number of smaller data sets, each of which may then be transferred by a different user device to a destination location. At the destination location, the smaller data sets can be reconstructed to produce the original larger data set for consumption. Thus, digital content or data can be delivered to low or no Internet areas by carrying all or pieces of the content through a series or multiple mobile devices of different users.

In one embodiment, the data can expire or be deleted if the data is not transferred to another device within a certain time period, thereby providing security that the data is not maintained on a particular device beyond a desired time frame. In another embodiment, the data is encrypted on each device, where only the destination device or final intended recipient can decrypt and thereby access the content, again providing security that interim devices or uses are unable to access the data. The encryption and decryption can be done with known processes, such as public key/private key pairings.

In one embodiment, an initial content or data provider, such as a merchant or user receives a request to transfer data to a recipient or recipient device, such as when the recipient purchases the digital data from a merchant, where the digital data may be a video, a song, an album, photos, a book, a movie, etc. The data provider can then provide the content to one or more "content hubs" at locations where users are more likely to move in and out of. Examples of content hubs are airports, train stations, bus stations, malls, hotels, and the like. The content may be provided in whole or broken up into smaller data blocks. Content delivered to these hubs can then be picked up by users and transported to other locations, including ones with low or no Internet, WiFi, or cellular coverage.

The same data may be provided to multiple users/devices for data redundancy in the event one or more of the devices does not or is unable to deliver the data to another user or the final recipient. However, once a data block is delivered, the same data blocks residing on other devices not yet delivered can be removed from those devices. If one or more data blocks are determined to not have been delivered to the final recipient, those missing data blocks can be transferred again to user devices for delivery, where the delivery devices may be given incentives for delivery within a certain time period to prioritize delivery of the missing data.

In various embodiments, the smaller data blocks may be all the same size (e.g., 20 data blocks of 1 MB each for a 20 MB digital content for delivery) or have different sizes and/or provided to different devices (e.g., a smart phone, a wearable, a tablet, etc.), such as based on bandwidth availability along a delivery route, urgency of data, amount of other users along the delivery route, and other factors. For example, more sensitive data may be provided to users with more secure devices or having a history of higher security, such as more frequent password changes, more complicated passwords, etc. Content can also be transferred directly from device to device, instead of only at content hubs.

In one example, an off-the-grid location that has low or no Internet coverage may nevertheless have a larger number of users who desire content (e.g., data) from others, such as family members, merchants, co-workers, and the like. Such a location may have many out-of-town visitors, e.g., tourists. For example, the Furnace Creek Visitor Center located in the Death Valley National Park in California, despite its extremely remote location and lack of any computer or cellular network coverage, may have thousands of visitors each year.

Each of these visitors may carry with her a mobile device that can store data, e.g., a smartphone, a tablet computer, or a USB drive. The storage capacity of these mobile user devices can be leveraged to transfer data to the Furnace Creek Visitor Center.

For example, to transfer a 1 GB educational video to the Furnace Creek Visitor Center, a data server storing the educational video may be placed at the last gas station before a user enters the Death Valley National Park. The data server may transfer 100 MB data to the smartphones of the first twenty users (e.g., for data redundancy reasons) that stop at the gas station. When these users drop by at the Furnace Creek Visitor Center, data uploaded onto their smartphones can then be downloaded to a data receiver located at the Furnace Creek Visitor Center. Thus, existing user behaviors can be leveraged to transfer data to an area where the Internet coverage is not available.

The systems and methods described in the present disclosure may provide a variety of technical advantages.

First, transferring a data set in these ways can be quite reliable. Users that are carrying data to a destination location do not incur a significant amount of cost (e.g., travelling to a location to which they already plan on travelling) and may be incentivized to ensure that the data reaches its destination.

Second, the cost for delivering data this way can be very low cost because the user is already traveling along a certain delivery route and costs to store data on a device the user is carrying is zero or very low. A dedicated delivery is not needed.

Third, data security (e.g. redundancy) can be maintained with minimal cost to a data sender. A data sender may create as many redundancies as needed, because the cost to the users for transferring data on behalf of the data sender is again low.

Additional details of implementations are now described in relation to the Figures.

FIG. 1 is a schematic view illustrating an embodiment of a system 100 for transferring data using mobile user devices. The system 100 may comprise or implement a plurality of servers and/or software components that use various technologies to perform the various operations provided in the present disclosure.

As illustrated in FIG. 1, the system 100 may include a user device 102 and one or more data storage devices 106. In the present disclosure, a user device may be a mobile USB device, a smartphone, a laptop computer, a notebook computer, a tablet computer, or a desktop computer.

In one embodiment, the user device 102 provides user travel data 126 to a data storage device 106, e.g., a flight boarding pass, a bus ticket, a taxi ride-sharing request, a flight literary, a travel plan, an auto trip schedule, or a combination thereof.

In one embodiment, a user device 102 exchanges user travel data 126 with a data storage device 106 when they are within a predefined proximity to each other (e.g., 10 feet) and when they are connected through a short-range peer-to-peer (P2P) connection, e.g., a Bluetooth Low Energy (BLE) connection, a Bluetooth connection, and a Wi-Fi connection.

A user device 102 may accept a data set from a data storage device located at a first location (e.g., the San Francisco International Airport, California) and store the data in a secure data storage 122 before travelling to a different location (e.g., the JFK International Airport, New York City, N.Y.) and download the data to a different data storage device located at that location, thereby transferring the data set from San Francisco to New York City.

The secure data storage 122 includes a hardware storage area for storing sensitive or private data—such as a Magnetic Resonance Imaging (MRI) data of a patient—in such a way that it is difficult to compromise (e.g., with multiple levels of encryptions or access restrictions). For example, a secure element of a user device may be located in a Universal Integrated Circuit Card (UICC), a Subscriber Identity Module (SIM) card, Secure Data (SD) card or embedded Secure Element (eSE), any of which may be plugged into or otherwise connected with the user device. In one embodiment, the secure data storage 122 stores (1) a data set 124 awaiting transfer to an intermediary or a destination storage device, as well as (2) the user travel data for access by a data storage device for data upload and download purposes.

In some embodiments, the location determination module 130 (e.g., a Global Positioning System (GPS) device and a cell tower triangulation device) provides location information of user device 102. A user device may, based on its current location, determine whether to accept a data transfer from an origin or intermediate data storage device and whether to download data onto a destination or intermediary data storage device. A data storage device may, based on a user device's current location, determine whether to invalidate data stored on user device. For example, if a user device has agreed to transfer data from San Francisco to New York City within 24 hours, but after 20 hours, the user device is determined to be still at San Francisco, a data storage device may determine that the data transfer is unlikely to be completed as agreed upon and thus (through an active BLE connection with the user device) invalidate or delete the data stored on the user device, e.g., to maintain data security.

In some embodiments, the data transmission module 132 enables one or more data transmissions between a user device and a data storage device. For example, a data transmission module may detect which data transfer protocols are mutually supported by a user device and a data storage device, e.g., a Bluetooth connection, a Wi-Fi connection, or a wired Ethernet or USB cable connection, and select one of the transmission protocols (e.g., a high-speed data transfer protocol or a high reliability data transfer protocol) for transferring data between the user device and the data storage device, such as based on the size of the data being transferred.

In one embodiment, the system 100 includes a plurality of data storage devices 106, at least one origin storage device, at least one destination storage device and optionally one or more intermediary storage devices.

An origin storage device may detect the presence of a user device and request the user device to help transfer data to a different location. For example, an origin storage device may implement a BLE protocol and actively seek out BLE connections with one or more smartphones or tablets and, after a BLE connection is successfully established, request a user's travel literary from a smartphone or tablet app (e.g. a travel app that has a user's e-boarding pass or e-bus ticket).

When connected to a user device, for example, through a wireless connection, an origin data storage device may, based on travel data provided by the user device and destination location of a data set, determine whether to transfer (e.g., download) the data set to the user device.

For example, if a data set is waiting to be transferred from San Francisco to New York City, and a user's email suggests that the user (and thus the smart watch that the user is wearing) is travelling to Houston, Tex., which is a shorter distance away from New York City than San Francisco is, the origin storage device may download the data set to the user's smart watch, so that the data set can be relocated to a location that is closer to the destination location.

In another example, if a data set is waiting to be transferred from San Francisco to New York City, and a user's calendar appointment suggests that the user (and thus the smartphone that the user is carrying) is travelling to Seattle, Wash., which is a greater distance away from New York City than San Francisco is, but after arriving in Seattle, the user will take a high speed jet liner (as opposed to a slower cross-country train ride) to New York City, the origin storage device may download the data set to the user's smart phone, so that the data set can be relocated to the destination location in a shorter amount of time.

In one embodiment, a destination storage device actively seeks to detect the presence of a user device to determine whether the user device is carrying a data set whose destination is the location of the destination storage device. The destination storage device may automatically download a data set that has reached its destination.

In one embodiment, a storage device may also function as an intermediary storage device, which may automatically transfer a data set from one user device to another user deice, if the data set can be better routed and delivered to its destination by the other device.

For example, if a user's smartphone is carrying a time sensitive data set (e.g., a patient's MRI results) that needs to be delivered from San Francisco to New York City (such as at a location known to have little or no Internet, WiFi, or cellular coverage) in an as soon as possible fashion, and a storage device located at the New Newark Liberty International Airport where the user has just landed may transfer the time sensitive data set to another's smartphone if the other user is also connected to the storage device and, more importantly, the other user's voice mail data indicate that she has a helicopter ride into the New York City in the next 5 minutes (as opposed to a taxi ride which is susceptible to traffic congestion when entering New York City). This way, a data set in-transit may be better routed to its destination in a timely and secure fashion.

In one embodiment, a storage device includes a data routing module 152, a data security module 154, and a database 156.

As explained above, the data routing module 152 may route (e.g., download a data set from one user device and upload the data set to another user device) in accordance with one or more delivery algorithms, which can reduce delivery time or increase data security. Example routing algorithms may include: a dynamic routing algorithm, a deflection routing algorithm, an edge disjoint shortest pair algorithm, a Dijkstra's algorithm, a flood search routing algorithm, a fuzzy routing algorithm, a geographic routing algorithm, a heuristic routing algorithm, and a hierarchical routing algorithm.

The data security module 154 may enforce data security policies on data carried on a user device or on a data storage device. For example, if the projected delivery time for a data set has expired, the data security module 154 may flag the data set as invalid, cancelling any future transfer of the data set (or any copies thereof), such as deleting the data set from the user device. For another example, if a time sensitive data set has been downgraded as non-time sensitive, the data security module 154 may revalidate a data set that has previously been deemed as invalid, reactivating a transfer of the data set (or any copies thereof).

For still another example, if the data security module 154 determines that a data set has been accessed without authorization, it may flag the data set as comprised and suspend or abort any future or pending transfer of the data set (or any copies thereof).

The database 156 may store one or more data sets awaiting transfer (or relay) to their final destinations or to one or more intermediary locations.

Figure 2:
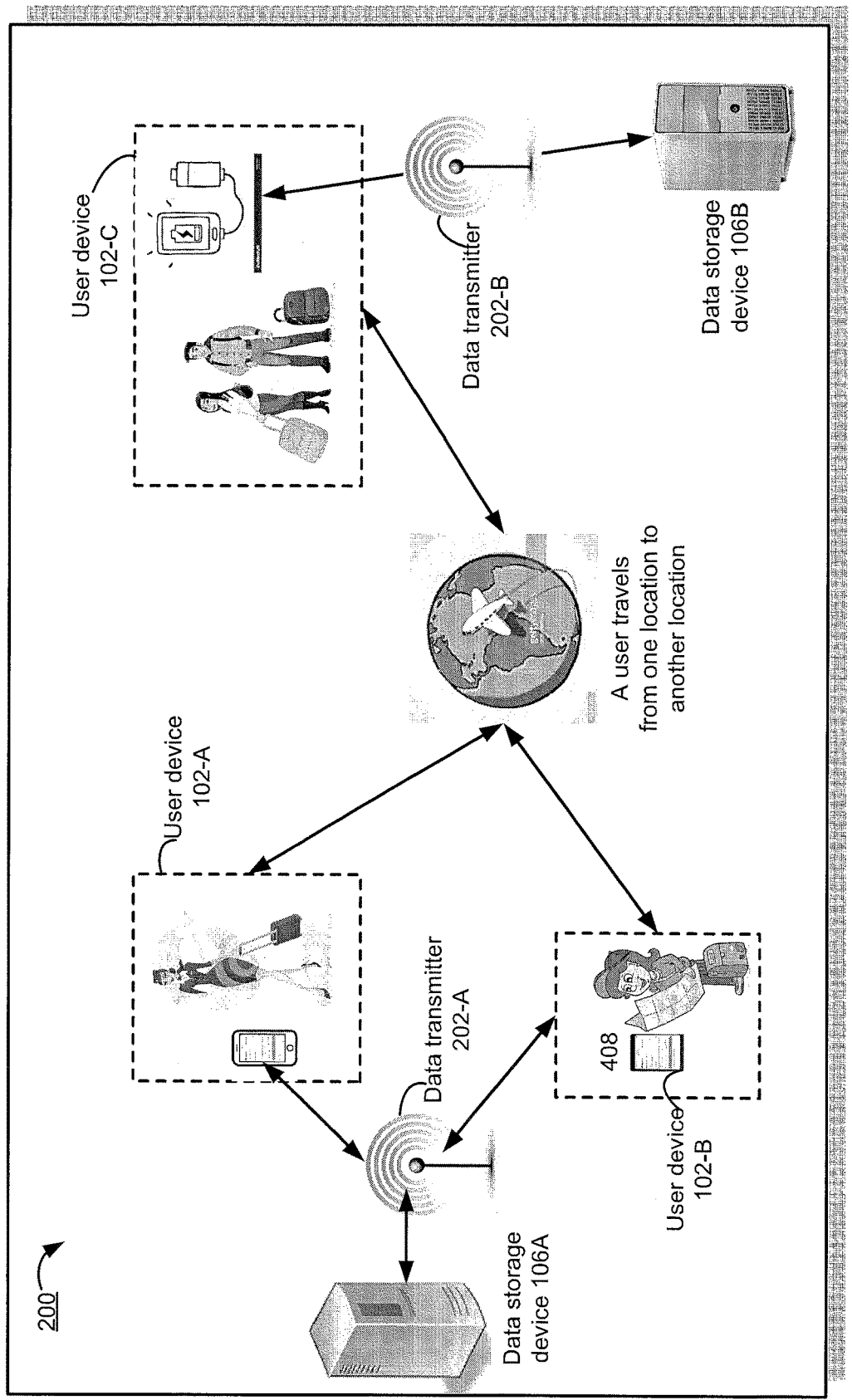
FIG. 2 is a schematic view illustrating an embodiment of a system for transferring data using mobile user devices.

FIG. 2 is a schematic view illustrating an embodiment of a system 200 for transferring data using mobile user devices. The system 200 may comprise or implement a plurality of servers and/or software components that operate to perform various technologies provided in the present disclosure.

As shown in FIG. 2, a user device 102-A has wirelessly connected to a data transmitter 202-A, which exchanges data with the data storage device 106A.

A data transmitter 202-A may first download travel data from the user device 102-A. the travel data may indicate that the user in possession of the user device 102-A is a professional pilot and will be travelling to several locations which coincide with the final destinations of several data sets being stored on the data storage device 106A.

The data transmitter 202-A may offer an incentive for agreeing to transfer a data set, for example, a free high-speed charge before boarding, an airport lounge pass, a free onboard drink, or a monetary incentive.

The data transmitter 202-A may offer an incentive based on information obtained from the user device 102-A, e.g., the power level of the user device 102-A, the Internet connection status of the user device 102-A, the user's identity, occupation, salary information, and purchase activities.

As also shown in FIG. 2, the user device 102-B has also wirelessly connected to the data transmitter 202-A. The data transmitter 202-A may identify that the user device 102-B is carrying a data set that can be delivered to its destination in a shorter amount of time if carried by the user device 102-A, and thus locally transfer the data set from the user device 102-B to the user device 102-A (e.g., through a P2P connection between these two devices).

The data transmitter 202-A may provide a data redundancy feature. For example, the data transmitter 202-A may duplicate, on the user device 102-A, a data set being carried by the user device 102-B, reducing the risk that the data set may be lost.

The data transmitter 202-A may download a data set to the user device 102-B, if the user device 102-B has more than a predefined percentage (e.g., 50%) of its storage space vacant. For example, if the user device 102-B is a 64 GB smartphone, but only 6 GB has been used, the data transmitter 202-A may download a 20 G data set or 10 data sets (2 G each) to the user device 102-B for transfer to another location.

As shown in FIG. 2, the data transmitter 202-B has wirelessly connected with the user device 102-C. The data transmitter 202-B may determine whether the user device 102-C is a candidate device for transferring a data set stored thereon to another location, e.g., an intermediary location or a destination location, based on information provided by the user device 102-C. For example, based on a determination that the user device 102-C is being charged by an external power bank and thus will likely have a longer service time, the data transmitter 202-B may download a greater number of data sets than it may onto a user device with a low battery level (e.g., less than 10%), because the latter may run out of power, delaying the transfer of any data set stored thereon. Available storage capacity on specific user devices may also be used to determine how much data to provide to those devices.

In another example, based on a determination that the user device 102-C is being carried by a user who is travelling with a companion on a personal sightseeing trip, the data transmitter 202-B may download a fewer number of data sets than it may onto a user device being carry by a user who is travelling alone on a business trip, because the user on the personal sightseeing trip may consume a greater amount of storage space on the user device 102-C, for example, to store sightseeing photos.

FIG. 3 is a flow chart illustrating an embodiment of a method 300 for transferring data using mobile user devices. The device 102, for example, when programmed and utilizing the technologies described in the present disclosure, can perform the method 300.

A data storage device may actively seek out user devices that are candidates for carrying data to a different location. In some implementations, the method 300 may therefore include detecting (302) that a user device is within a first predefined proximity to a first data storage device.

For example, a data storage device may be part of a wireless router providing Internet Wi-Fi connections to nearby (e.g., within 50 feet) user devices. A user device attempting to access an Internet Wi-Fi connection through the wireless router may be requested by the data storage device to carry a data set, e.g., for free or as an exchange for receiving the Internet Wi-Fi connection.

For example, a data storage device may be part of a charging station providing power charges, wirelessly or through wired cables, to user devices. A user charging her smartphone at the charging station may be requested by the data storage device to carry a data set, e.g., for free or as an exchange for receiving a power charge.

In some alternative implementations, a user device may actively seek out data storage devices by identifying itself as capable and willing to carry data to a different location, with or without a return.

In one embodiment, a data storage device may receive a data set from a merchant or any other data provider as a result of a user purchasing the data set, which may be a digital movie, a video, a song, an album, photos, a book, a movie, etc. To digitally deliver the data set to the user, who may be located at an off-the-grid location where an Internet connection is unavailable, the data provider can then provide the data set to one or more "content hubs" at locations where other users are more likely to move in and out of. Examples of content hubs are airports, train stations, bus stations, malls, hotels, and the like. The location of the hubs may be based on projected traffic through the hubs, the initial data set location, the end data set delivery location, the time or day the data set is targeted for receipt at the delivery location, the security level of the data set, availability of the hub (e.g., hours that users can access the hub), and the like.

The data set the user purchased may be provided in whole or broken up into smaller data blocks, e.g., for ease of transportation and delivery. Content delivered to these hubs can then be picked up by users and transported to other locations, including ones with low or no Internet, WiFi, or cellular coverage.

In one embodiment, the smaller data blocks may be of substantially the same size (e.g., 50 data blocks of 10 MB each for a 500 MB digital movie for delivery) or have different sizes and/or provided to different devices with different storage capacities (e.g., a 16 GB smart phone, a 128 MB wearable device, a 64 GB tablet computer, etc.), such as based on bandwidth availability along a delivery route, urgency of data, amount of other users along the delivery route, and other factors.

The method may include determining (304) a next destination of the user device based on user travel information. A user's travel information may be used to evaluate whether a user device may be a candidate user device to carry a particular data set. For example, transferring a data set that needs to be delivered at New York to a smartphone of a user flying to Chennai, India may delay the delivery of the data set and thus should be avoided.

A data storage device may select a data set for downloading to a user device based on the next destination of the user device. In some implementations, for example, the method 300 includes selecting (306) a data set stored on the data storage device in accordance with the next destination of the user device, wherein the data set is associated with a destination location.

Note that the next destination of the user device may differ from the final destination of the user device. Considering the next destination, rather than only the final destination, of a user device is technically advantageous, because it would allow one or more routing algorithms to be applied to better route a data set and provide more options, which may result in a more timely delivery even if broken into several delivery locations before the final destination.

A data storage device may transfer a data set to a user device wirelessly or in a seamless or inconspicuous fashion to reduce user inconvenience. In some implementations, the method 300 includes transferring (308) the data set from the data storage device to the user device.

A destination or intermediary data storage device may actively seek out connections to nearby user devices to see if any data set carried thereon can be unloaded or transferred for better routing or final delivery. In some implementations, the method 300 therefore includes detecting (310) that the user device is within a second predefined proximity to a second data storage device.

If a user device has reached the final destination or an intermediary location, the data set may be unloaded from the user device to a local data storage device or to another user device for further routing and eventual delivery.

The method 300 may include determining (312) a location of the second data storage device; and determining (314) that a predefined relationship exists between destination location of the data set and the location of the second data storage device; and in response to determining the predefined relationship, transfer (316) the data set from the user device to the second data storage device.

In some other embodiments, the data set is delivery through a P2P connection to a destination device, rather than being transferred from a user device to a destination storage device (e.g., a content hub).

In some implementations, the user travel information identifies a travel literary of a user associated with the user device. For example, the user travel information may be a user's connecting information from a flight from the San Francisco International Airport to the Beijing International Airport.

A user incentive for carrying a data set may be provided. In some implementations, the method 300 may further include, responsive to transferring the data set from the data storage device to the user device, providing a reward to a user associated with the user device. For example, the user may be offered a free in-flight Wi-Fi connection for carrying a 100M data set, but a free on-board drink ticket for carrying a 500M data set.

A data redundancy feature may be provided to reduce the risk that a data set may be lost in-transit. In some implementations, the method 300 may further include, responsive transferring the data set to a second user device associated with the next destination to create a data redundancy. Here, the second user device may share a predefined relationship with the first user device, for example, the first and second user devices are devices belong to users with in a same family or users travelling with different airlines (which may have different average flight delays).

A data set may be downloaded to a user device for transfer to an intermediary location other than the data set's final destination, e.g., when the intermediary location provides a greater routing opportunity.

In some implementations, the method 300 may further include: transferring the data set to a second user device associated with a second next destination that shares a second predefined relationship with the destination location associated with the data set.

A data set in-transit may be invalidated and thus removed from a transfer, if a data transfer or delivery requirement is violated. In some implementations, the method 300 may further include: determining that a delivery requirement associated with the data set is not met; and responsive to the determining, identifying the data set as invalid. The delivery requirement may be one of: a location requirement, a time requirement, and a redundancy requirement.

For example, if a data set's metadata specifies that the data set can be canceled from being transferred if another copy of the same data set has reached the final destination, then the data set may be taken out of circulation (e.g., by having its status flag changed to "discard") if another copy has been delivered.

For example, for security reasons, if a data set's metadata specifies that the data set cannot be transferred to a location outside the continental United States, and the GPS data of the user device carrying the data set show that the user device is currently located in China, then the data transmission module 132 may destroy the data set to protect data security.

Note that the data transmission module 132 may modify data set being carried on a user device without needing a communication to a data storage device. This is technically advantageous, because it provides an increased level of data security. For example, due to its mobility, a user device (carrying a data set in transit) may not be in communication with a data storage device for a prolong time period (e.g., during a long flight, when the user device is out of power, or when a user switches off the user device).

Therefore, having security controls running independently on a user device can reduce the risk of unauthorized access to data set in violation of a delivery requirement.

Figure 4:
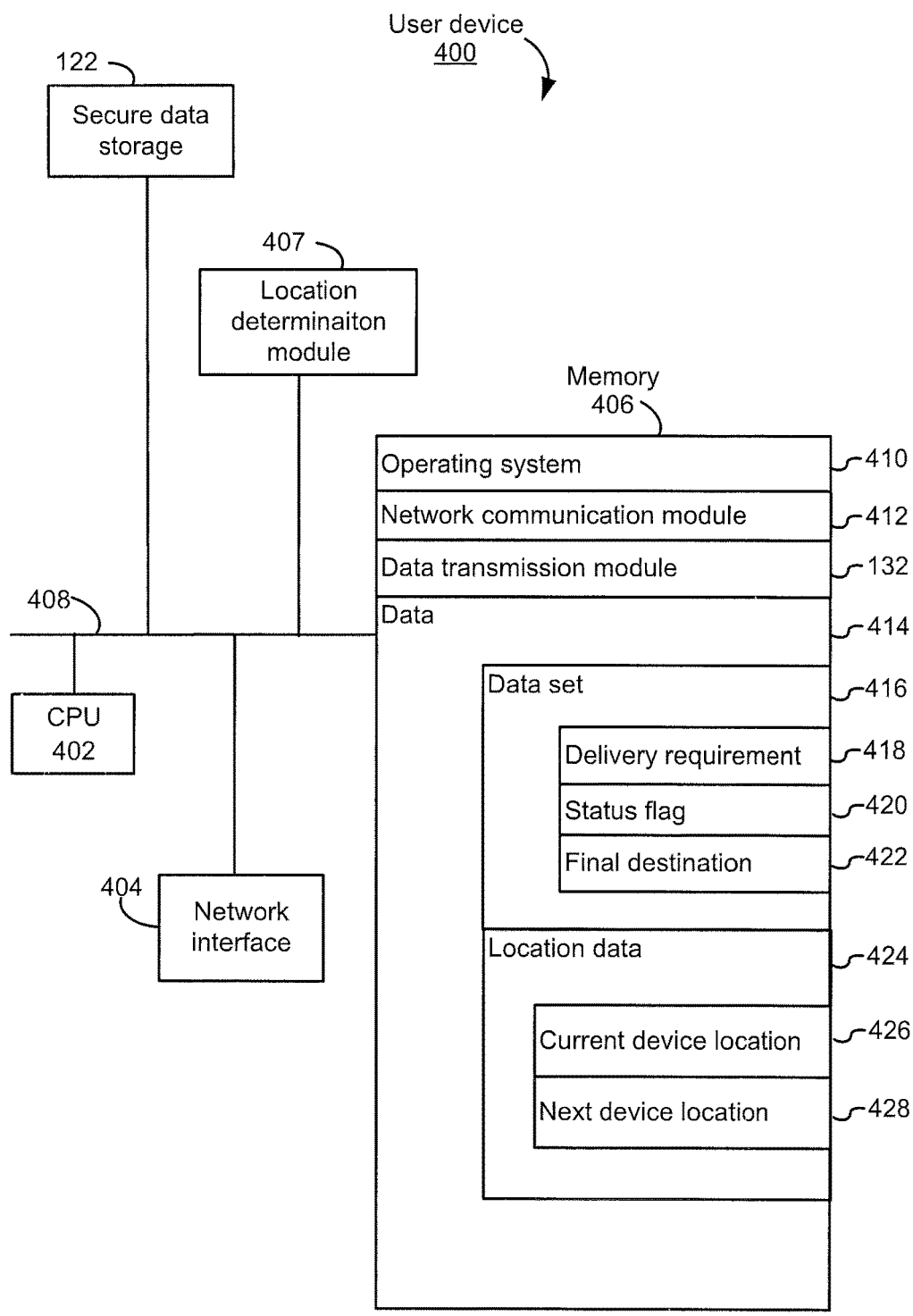
FIG. 4 is a schematic view illustrating an embodiment of a user device.

FIG. 4 is a schematic view illustrating an embodiment of a user device 400, which can be the user device 102 shown in FIG. 1. The device 400 in some implementations includes one or more processing units CPU(s) 402 (also referred to as hardware processors), one or more network interfaces 404, a memory 406, and one or more communication buses 408 for interconnecting these components. The communication buses 408 optionally include circuitry (sometimes called a chipset) that interconnects and controls communications between system components. The memory 406 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 406 optionally includes one or more storage devices remotely located from the CPU(s) 402. The memory 406, or alternatively the non-volatile memory device(s) within the memory 406, comprises a non-transitory computer readable storage medium. In some implementations, the memory 406 or alternatively the non-transitory computer readable storage medium stores the following programs, modules and data structures, or a subset thereof:

- an operating system 410, which includes procedures for handling various basic system services and for performing hardware dependent tasks;
- a network communication module (or instructions) 412 for connecting the device 400 with other devices (e.g. another user device 400 or a data storage device 406) via one or more network interfaces 404 (wired or wireless) or via the communication network 104 (FIG. 1);
- data 414 stored on the device 400, which may include:
  - a data set 416 and its associated metadata which may include:
    - a delivery requirement 418 for specifying a restriction (e.g., time, redundancy, or location) under which the data set 416 may be stored on or transferred to and out of the device 400;
    - a status flag 420 for indicating a current status of the data set 416, e.g., whether the data set 416 has one or more redundancy copies or whether the data set 416 is still valid or has expired; and
    - a final destination 422 for identifying the eventual intended geographical destination to which a copy of the data set 416 is to be delivered; and
  - location data 424, which may include:
    - a current device location 426 for indicating the current geographical location of the device 400; and
    - a next device location 428 for indicating, with a predefined degree of certainty, the next geographical location at which the device 400 will be, e.g., a destination city on a user's flight literary.

The device 400 may also include a secure data storage 122 for storing one or more data sets for delivery to an intermediary location or to the destination location, as well as a location determination module 407 (e.g., a GPS device) for determining a current location of the user device 400.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 406 optionally stores a subset of the modules and data structures identified above. Furthermore, the memory 406 may store additional modules and data structures not described above.

Figure 5:
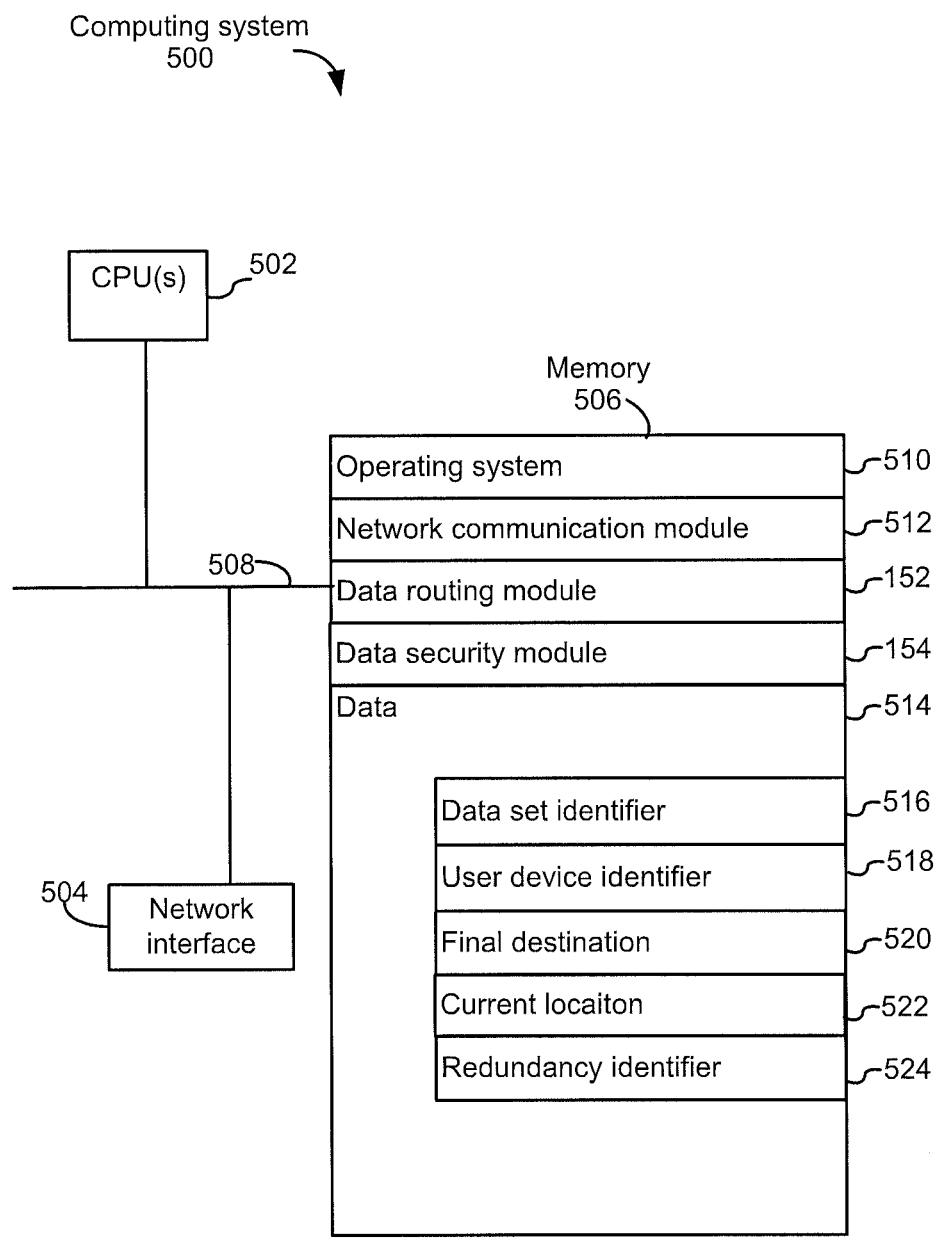
FIG. 5 is a schematic view illustrating an embodiment of a computing system.

FIG. 5 is a schematic view illustrating an embodiment of a computing system 500, which can be the data storage device 106 shown in FIG. 1. The system 500 in some implementations includes one or more processing units CPU(s) 502 (also referred to as hardware processors), one or more network interfaces 504, a memory 506, and one or more communication buses 508 for interconnecting these components. The communication buses 508 optionally include circuitry (sometimes called a chipset) that interconnects and controls communications between system components. The memory 506 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 506 optionally includes one or more storage devices remotely located from the CPU(s) 502. The memory 506, or alternatively the non-volatile memory device(s) within the memory 506, comprises a non-transitory computer readable storage medium. In some implementations, the memory 506 or alternatively the non-transitory computer readable storage medium stores the following programs, modules and data structures, or a subset thereof:

- an operating system 510, which includes procedures for handling various basic system services and for performing hardware dependent tasks;

a network communication module (or instructions) 512 for connecting the system 500 with other devices (e.g., a user device 102) via one or more network interfaces 504;

a data routing module 152 for determining whether to transfer a data set to a user device with a particular next destination based on the final destination of the data set;

a data security module 154 for controlling access to and managing the storage of a data set; and data 514 stored on the system 500, which may include:
  a data set identifier 516 for uniquely identifying a given data set or a copy thereof;
  a user device identifier 518 for uniquely identifying a user device on which a copy of the data set identified by the data set identifier 516 is stored;
  a final destination 520 for identifying the eventual intended geographical destination to which a copy of the data set identified by the data set identifier 516 is to be delivered;
  a current location 522 for identifying the current geographical location at which a copy of the data set identified by the data set identifier 516 is; and
  a redundancy identifier 524 for identifying one or more other copies of the data set identified by the data set identifier 516 and their corresponding current locations.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 506 optionally stores a subset of the modules and data structures identified above. Furthermore, the memory 506 may store additional modules and data structures not described above.

Although FIGS. 4 and 5 show a "user device 400" and a "computing system 500" and respectively, FIGS. 4 and 5 are intended more as functional description of the various features which may be present in computer systems than as a structural schematic of the implementations described herein. In practice, and as recognized by those of ordinary skill in the art, items shown separately could be combined and some items could be separated.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and users; however, a user or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
  detecting that a first user device is within a first predefined proximity to a first data storage device;
  determining a destination location of the first user device based on user travel information;
  selecting, in response to the determining the destination location, a data set stored on the first data storage device, wherein the data set is associated with the destination location;
  transferring the data set from the first data storage device to the first user device;
  detecting that the first user device is within a second predefined proximity to a second data storage device;
  determining a location of the second data storage device;
  determining that a predefined relationship exists between the destination location of the data set and the location of the second data storage device;
  in response to determining the predefined relationship, transferring the data set from the first user device to the second data storage device;
  transferring the data set to a second user device for delivery;
  determining whether the data set has been delivered to the destination location; and
  based on whether the data set has been delivered to the destination location, destroying the data set or expediting delivery of the data set.

2. The method of claim 1, wherein the user travel information identifies a travel literary of a user associated with the first user device.

3. The method of claim 1, further comprising: responsive to transferring the data set from the first data storage device to the first user device, providing a reward to a user associated with the first user device.

4. The method of claim 1, wherein the second user device is associated with the destination location, and wherein the method further comprises: transferring a copy of the data set to the second user device to create a data redundancy.

5. The method of claim 1, wherein the second user device is associated with a second destination location that shares a second predefined relationship with the destination location associated with the data set.

6. The method of claim 1, further comprising:
   determining that a delivery requirement associated with the data set is not met; and
   based on the delivery requirement not being met, identifying the data set as invalid.

7. The method of claim 6, wherein the delivery requirement comprises one of: a location requirement, a time requirement, or a redundancy requirement.

8. The method of claim 1, further comprising: charging the first user device while transferring the data set from the first data storage device to the first user device.

9. The method of claim 1, wherein an intended data set for the destination location comprises a plurality of data sets including the data set.

10. The method of claim 1, wherein a size of the data set depends on the first user device.

11. The method of claim 10, wherein the size depends on a type of the first user device.

12. A non-transitory machine-readable medium having stored thereon machine-readable instructions executable to cause a machine to perform operations comprising:
   detecting that a first user device is within a first predefined proximity to a first data storage device;
   determining a destination location of the first user device based on user travel information;
   selecting, in response to the determining the destination location, a data set stored on the first data storage device, wherein the data set is associated with the destination location;
   transferring the data set from the first data storage device to the first user device;
   detecting that the first user device is within a second predefined proximity to a second data storage device;
   determining a location of the second data storage device;
   determining that a predefined relationship exists between destination location of the data set and the location of the second data storage device;
   in response to determining the predefined relationship, transferring the data set from the first user device to the second data storage device;
   transferring the data set to a second user device for delivery;
   determining that the data set has been delivered to the destination location; and
   in response to the determining that the data set has been delivered to the destination location, destroying the data set.

13. The non-transitory machine-readable medium of claim 12, wherein the operations further comprise: splitting a data record into a plurality of data sets, including the data set.

14. The non-transitory machine-readable medium of claim 13, wherein the plurality of data sets includes two or more data sets having different sizes.

15. The non-transitory machine-readable medium of claim 12, wherein prior to transferring the data set from the first data storage device to the first user device, the operations further comprise: encrypting the data set.

16. The non-transitory machine-readable medium of claim 12, wherein the operations further comprise:
   determining that the data set has not been delivered to the destination location after a threshold amount of time has passed; and
   expediting delivery of the data set.

17. A system, comprising:
   a non-transitory memory; and
   one or more hardware processors coupled to the non-transitory memory and configured to execute instructions from the non-transitory memory to cause the system to perform operations comprising:
   detecting that a first user device is within a first predefined proximity to a first data storage device;
   determining a destination location of the first user device based on user travel information;
   selecting, in response to the determining the destination location, a data set stored on the first data storage device, wherein the data set is associated with the destination location;
   transferring the data set from the first data storage device to the first user device;
   detecting that the first user device is within a second predefined proximity to a second data storage device;
   determining a location of the second data storage device;
   determining that a predefined relationship exists between destination location of the data set and the location of the second data storage device;
   in response to determining the predefined relationship, transferring the data set from the first user device to the second data storage device;
   transferring the data set to a second user device for delivery;
   determining that the data set has not been delivered to the destination location after a threshold amount of time has passed; and
   in response to the determining that the data set has not been delivered to the destination location after a threshold amount of time has passed, expediting delivery of the data set.

18. The system of claim 17, wherein the operations further comprise:
   determining that the data set is delivered to the destination location; and
   destroying the data set.

19. The system of claim 17, wherein the second user device is associated with a second destination location that shares a second predefined relationship with the destination location associated with the data set.

20. The system of claim 17, wherein an intended data set for the destination location comprises a plurality of data sets including the data set.

* * * * *